3,028,376
TRIS AZO DYES
Ermanno Gaetani, Milan, Italy, assignor to Aziende Colori Nazionali Affini ACNA S.p.A., Milan, Italy
No Drawing. Filed Apr. 14, 1960, Ser. No. 22,121
Claims priority, application Italy Apr. 16, 1959
1 Claim. (Cl. 260—169)

An object of the present invention is to provide certain tris-azo dyes, insoluble in water, having the following general Formula A

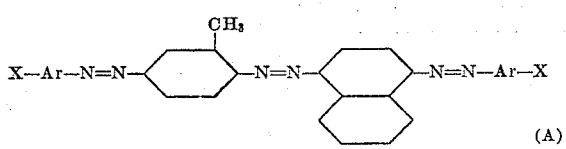
(A)

where X is selected from the group consisting of hydroxy and disubstituted amino groups and Ar is selected from the group consisting of phenyl and naphthyl groups.

The dyes of the above mentioned general Formula A are suitable for direct dyeing of polyolefinic materials by simple application at the boiling temperature of the dyeing bath.

Among the dyes of said general Formula A, the following dyes have shown to be particularly suitable for this dyeing of polypropylene and polyethylene materials:

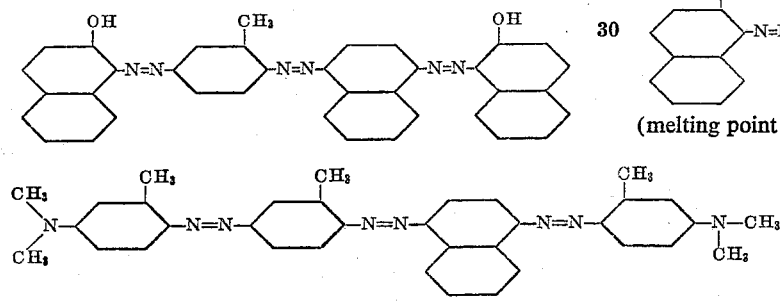

The compounds of general Formula A are obtained by diazotising in the presence of a strong acid, with sodium nitrite one mol of a diamino azo compound of the type:

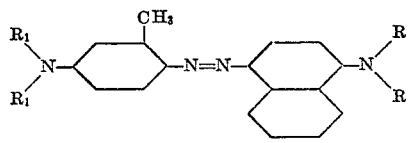

wherein R and $R_1$ each represents hydrogen, and by coupling in the presence of a strong base the bis-diazo-azo compound formed with a compound of the type:

H ArX wherein Ar and X have the above mentioned meaning.

The following examples will further illustrate my invention however without limiting its scope. (All parts are by weight unless otherwise indicated.)

*Example 1*

15.2 g. 5-nitro-2-amino-toluene are diazotised as usual with 150 g. water, 35 g. hydrochloric acid (density 1.17) by rapidly adding 7 g. sodium nitrite in 20 g. water and keeping the temperature at 0° C.; the diazo-compound obtained is introduced into a solution consisting of 15 g. α-naphthylamine, 15 g. hydrochloric acid and 350 g. water; thereafter, a 50% sodium acetate (crystals) solution is gradually added until the mass gives a negative reaction in the presence of the Congo red indicator. The nitro-amino-azo-dye obtained is filtered and washed; it is then dispersed in 300 g. water, alkalinized with ammonia and treated at 80° C. with about 14 g. sodium sulfide; the diamino-azo dye formed is filtered, washed and recrystallized from 70% alcohol (melting point 167° C.).

13.8 g. (4-amino-2-methyl)<1-azo-4>1-naphthylamine thus obtained are suspended in 300 g. water, 35 g. conc. hydrochloric acid and are diazotised with 7 g. sodium nitrite in 20 g. water while keeping the temperature at between 0° and 5° C. by careful ice addition.

The bis-diazo-azo compound obtained is carefully added to a solution of 15.5 g. β-naphthol in 200 g. water, 14 g. sodium hydroxide solution (36° Bé.) and 35 g. 30% ammonia solution; at the end of the coupling the tris-azo-dye obtained is filtered, washed until it is neutral and dried; after grinding it consists of a dark powder having the formula:

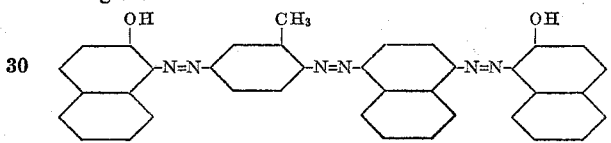

(melting point 185° C.).

By chromatography (eluent organic portion of the mixture butanol: acetic acid: water=4:1:5) a uniform violet spot is observed which turns neither with a hydrochloric acid nor with a sodium hydroxide solution.

*Example 2*

13.8 g. (4-amino-2-methyl)<1-azo-4>1-naphthylamine, obtained as described in the preceding example, are diazotised as described and are then added to a solution of 14.5 g. N,N-dimethyl-m-toluidine in 200 g. water and 75 g. conc. hydrochloric acid (density 1.17); immediately thereafter a 50% aqueous sodium acetate solution is added until there is no acid reaction with Congo red indicator. The tris-azo dye thus formed is filtered, washed to neutrality and dried; it consists of a dark-brown powder having the following formula:

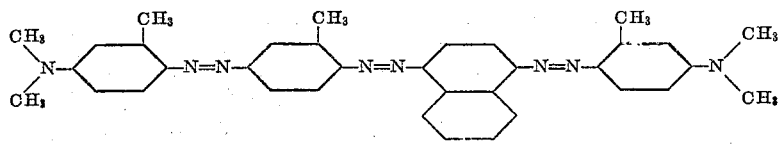

(melting point 160° C.).

By paper chromatography a uniform violaceous red spot is observed which turns to blue with a hydrochloric acid solution and remains unaltered with a sodium hydroxide solution.

Having thus described my invention, what I desire to secure and to claim by Letters Patent is:

The trisazo dye, insoluble in water, having the formula:

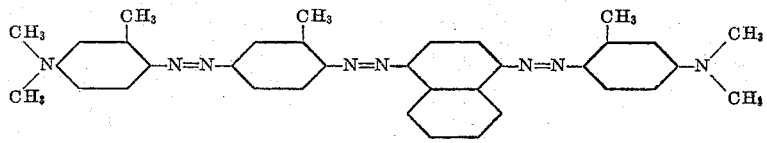

References Cited in the file of this patent

UNITED STATES PATENTS 2,090,938    Conrad _____ Aug. 24, 1937

FOREIGN PATENTS 80,421    Germany _____ Dec. 17, 1891
84,289    Germany _____ Dec. 16, 1894
277       Great Britain _____ 1892